March 8, 1966 J. RYWAK 3,239,778
TEMPERATURE COMPENSATOR IN MULTIVIBRATOR CIRCUITS
Filed July 10, 1964 4 Sheets-Sheet 1
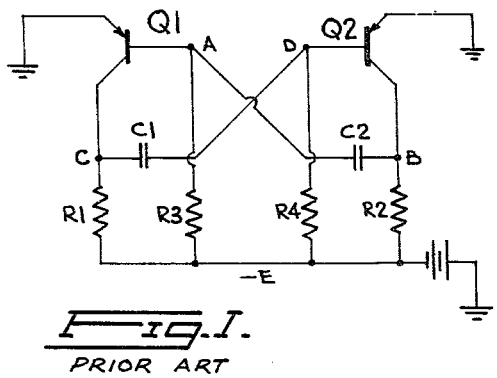
Fig. 1.
PRIOR ART
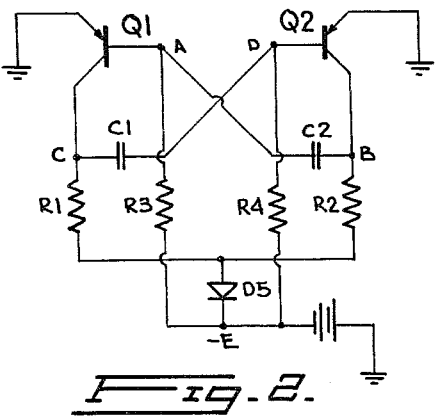
Fig. 2.
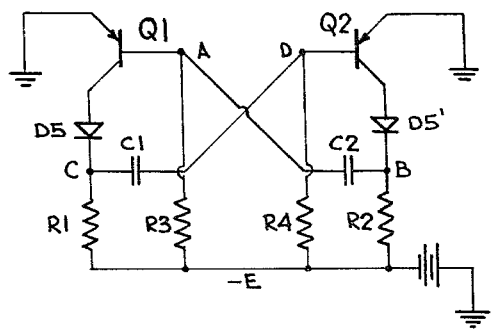
Fig. 3.
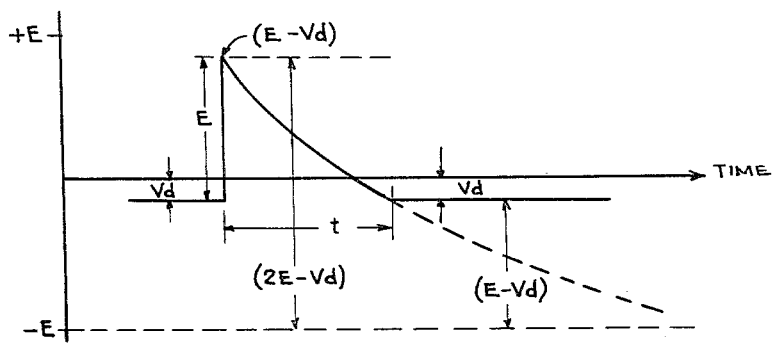
Fig. 4.
VOLTAGE AT REFERENCE
POINT A IN FIG. 1
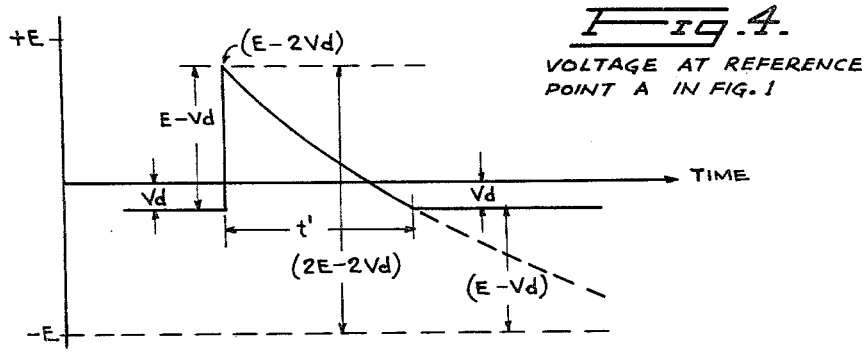
Fig. 5. VOLTAGE AT REFERENCE POINT A IN FIGS. 2 AND 3

March 8, 1966     J. RYWAK     3,239,778
TEMPERATURE COMPENSATOR IN MULTIVIBRATOR CIRCUITS
Filed July 10, 1964     4 Sheets-Sheet 2

VOLTAGE AT REFERENCE POINT A IN FIG. 6 (WITHOUT D5 AND D6)

VOLTAGE AT REFERENCE POINT A IN FIG. 6

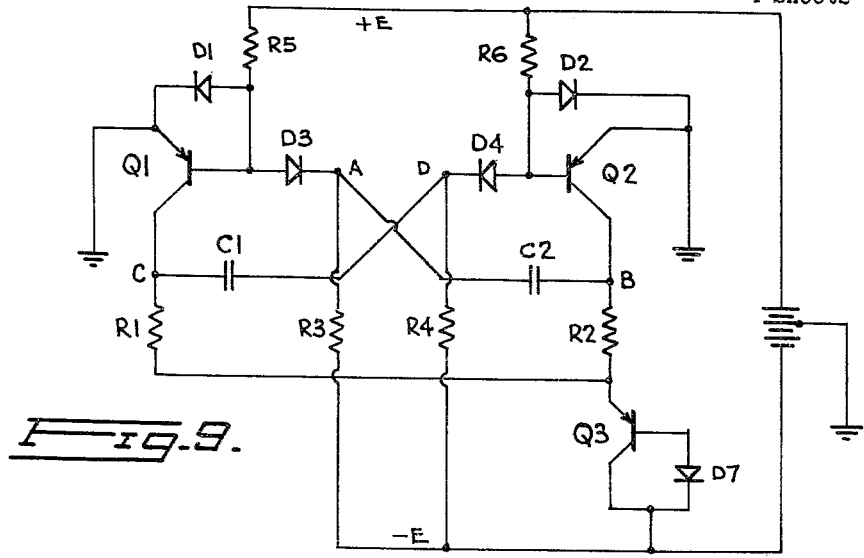
Fig. 9.
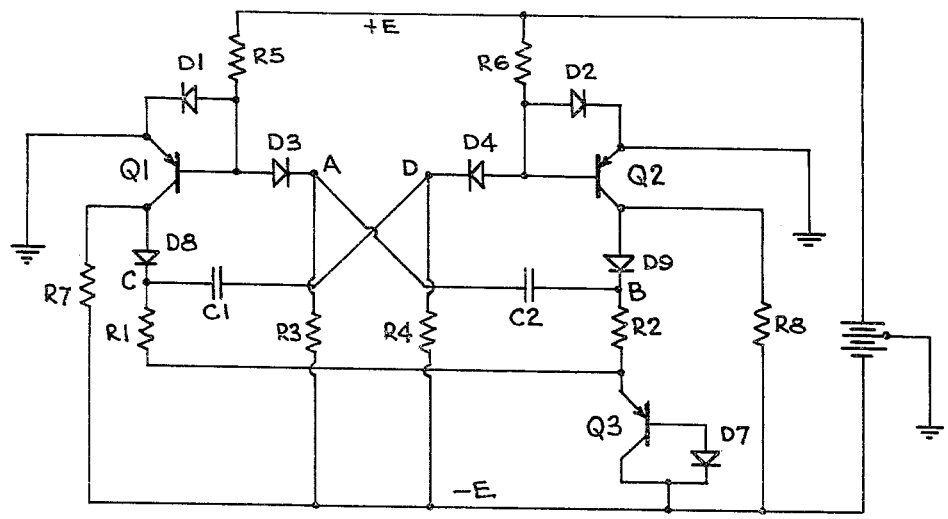
Fig. 11.
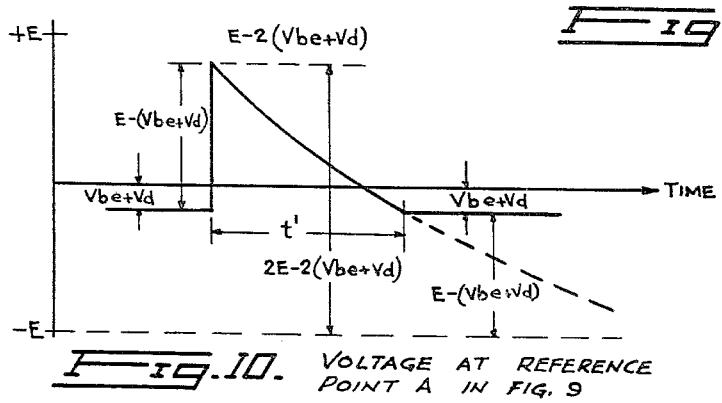
Fig. 10. VOLTAGE AT REFERENCE POINT A IN FIG. 9

March 8, 1966   J. RYWAK   3,239,778
TEMPERATURE COMPENSATOR IN MULTIVIBRATOR CIRCUITS
Filed July 10, 1964   4 Sheets-Sheet 4

United States Patent Office 3,239,778
Patented Mar. 8, 1966

3,239,778
TEMPERATURE COMPENSATOR IN
MULTIVIBRATOR CIRCUITS
John Rywak, Ottawa, Ontario, Canada, assignor to Northern Electric Company Limited, Montreal, Quebec, Canada
Filed July 10, 1964, Ser. No. 381,651
14 Claims. (Cl. 331—113)

This application is a continuation-in-part of application Serial No. 211,774 filed July 23, 1962 and now abandoned.

This invention relates to temperature compensation in multivibrators of the type having a pair of transistors interconnected for mutual reversal of state.

Multivibrators have various uses, such as generating square waves, or generating pulses of specified duration. However multivibrator devices commonly have the undesirable feature that their time characteristics vary with temperature.

An object of the present invention is to provide temperature compensation in such devices in a manner that will effect a substantial reduction in the temperature dependence of their time characteristics. A further object is to achieve this result reliably and in a simple manner without appreciable increase in the complexity and cost of the device concerned.

To this end the invention comprises a multivibrator device comprising a circuit for controlling the periodicity of the device, said circuit having a timing equation containing a term including a temperature dependent voltage that is initially imposed on said circuit, means for producing a voltage substantially equal to and temperature dependent with said initial voltage, and means coupling said produced voltage in said circuit to compensate for said initial voltage to render the periodicity less temperature dependent.

Various embodiments of the invention are illustrated in the accompanying drawings, the device illustrated being shown by way of example only, while the broad scope of the invention is defined by the appended claims.

In the drawings:

FIGURE 1 is a conventional free running multi-vibrator employing transistors;

FIGURE 2 is an improved multi-vibrator circuit of the type shown in FIGURE 1 embodying one aspect of the invention;

FIGURE 3 is a modification of the circuit of FIGURE 2;

FIGURE 4 is a voltage-time plot illustrating the discharge of capacitors used in a circuit of the type shown in FIGURE 1;

FIGURE 5 is a voltage-time plot illustrating the discharge of capacitors used in circuits of the type shown in FIGURES 2 and 3;

FIGURE 9 shows a multivibrator circuit similar to that of FIGURE 6 but embodying a modification of the invention;

FIGURE 10 is a voltage-time plot illustrating the discharge of capacitors used in a circuit of the type shown in FIGURE 9;

FIGURE 11 shows a modification of the circuit of FIGURE 9;

Figure 6:
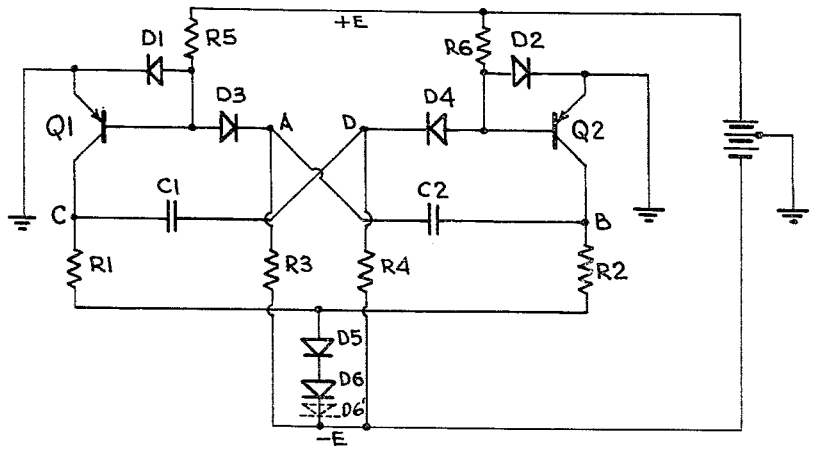
FIGURE 6 shows another type of multivibrator circuit embodying the invention.

Referring first to FIGURE 1, there is shown a conventional free-running multi-vibrator having first and second transistors Q1 and Q2 respectively. The transistors are cross connected by a first coupling arm extending from the collector of transistor Q1 to the base of transistor Q2 and containing a capacitor C1, and by a second coupling arm connected between the collector of transistor Q2 and the base of transistor Q1 and containing capacitor C2. The transistor emitters are both connected to ground. The collectors of transistors Q1 and Q2 are respectively connected to a negative voltage —E (e.g. —15 volts) through charging resistors R1 and R2 respectively, and the bases of the transistors are connected to —E through timing resistors R3 and R4 respectively. A, B, C and D are reference points.

The multivibrator circuit shown in FIGURE 2 is identical to that of FIGURE 1 except that compensating diode D5 is connected between the junction point of charging resistors R1 and R2, and the —E supply.

The operation of the circuit of FIGURE 1 is as follows: Assume that transistor Q1 has just completed a conducting period and transistor Q2 is about to begin to conduct. Then, during the conducting period of transistor Q1, capacitor C2 will have become charged through the circuit comprising ground, the emitter-base junction of transistor Q1, capacitor C2, resistor R2 and the —E supply. Since transistor Q2 is not yet conducting, reference point B will be at a potential —E. Reference point A will have reached a potential just below ground, i.e. it will be below ground by the voltage drop Vd in the emitter-base junction of transistor Q1. This situation is shown in FIGURE 4 which plots the voltage at point A.

When transistor Q2 begins to conduct, its collector and hence point B suddenly begin to rise towards ground level. As a result, a positive going step of magnitude +E volts is transmitted through capacitor C2, so that point A suddenly begins to rise by +E, reverse biasing transistor Q1 and beginning to turn it off. The collector of transistor Q1, and hence point C, now begin to fall toward —E, and through capacitor C1, point D also begins to fall by —E, forward biasing transistor Q2 and turning it on even more. The resulting regenerative action thus turns transistor Q2 on into saturation and transistor Q1 off.

Now, capacitor C2 begins to discharge through the circuit comprising ground, transistor Q2, capacitor C2, and timing resistor R3. The potential of reference point A begins to fall from its level of E—Vd towards —E as shown in FIGURE 4. When capacitor C2 discharges sufficiently that reference point A reaches a potential Vd below ground, transistor Q1 begins to turn on and the resulting regenerative action quickly turns it on into saturation and transistor Q2 off. This process repeats indefinitely to provide a free running multivibrator.

The conventional circuit just described is sensitive to temperature variations because of resistance changes in timing resistors R3 and R4, capacitance changes in C1 and C2, beta changes in transistors Q1 and Q2, transistor current leakage changes which cause varying voltage drops in resistors R1 and R2, and changes in emitter-base drop in the transistors.

The effects caused by the RC timing networks consisting of capacitor C1 and resistor R2, and capacitor C2 and resistor R1, can be minimized by selecting capacitors and resistors which have very low temperature coefficients. The effect of the beta variation with temperature is relatively small and can be ignored for the moment. It is the variation in the frequency of the device caused by the temperature dependence of the voltage drop $Vd$ of the emitter-base junctions of the transistors with which the present aspect of the invention is primarily concerned.

In the conventional free running multi-vibrator of FIGURE 1, it may be observed from FIGURE 4 that the time interval $t$ between the turning off of transistor Q1 and the commencement of the regenerative action which turns it on again is governed primarily by the discharge of capacitor C2. A computation of the duration of this time $t$ is as follows:

At the commencement of discharge of capacitor C2, reference point A and hence one end of resistor R3 is at the potential $E-Vd$ volts above ground. Since the other end of resistor R3 is at the potential $-E$ volts, the total voltage across resistor R3 is $2E-Vd$ volts and initial discharging current flows through R3 as a result of this total voltage. Hence initial discharging current through the discharge circuit is:

$$i \text{ (initial)} = \frac{2E-Vd}{R3}$$

At the time when transistor Q1 begins to turn on again, the voltage at reference point A has fallen to $Vd$ volts below ground and the voltage across resistor R3 has reached the magnitude $E-Vd$, so the final discharging current through the discharge circuit is at this time.

$$i \text{ (final)} = \frac{E-Vd}{R3}$$

Since $$i \text{ (final)} = i \text{ (initial)} \exp\left[\frac{-t}{R3C2}\right]$$

$$\frac{E-Vd}{R3} = \frac{2E-Vd}{R3} \exp\left[\frac{-t}{R3C2}\right]$$

Solving for $t$ then, $$t = R3C2 \ln\left[\frac{2E-Vd}{E-Vd}\right]$$

Although this analysis is only approximate, it is apparent from the solution for $t$ that the duration of a non-conducting state of transistor Q1 (and of transistor Q2 also) will vary with a variation in $Vd$. Assuming the same value of $t$ for the non-conducting state of transistor Q2, the frequency will vary inversely with $t$ and will hence be temperature dependent.

Compensation is provided according to the circuit of FIGURE 2 by insertion of diode D5, which is of similar material to that of the emitter-base junctions of the transistors, in order to have the same temperature characteristics. With diode D5 in the circuit, when for example transistor Q2 begins to conduct, the voltage at point B (and hence at point A) suddenly rises by $E-Vd$, instead of by E volts as in the uncompensated case. The new situation in shown in FIGURE 5. The new voltage as a result of which initial discharging current flows through resistor R3, is now $2E-2Vd$. The new time $t$, between the turning off of transistor Q1 and the commencement of its turning on again is computed as follows:

$$i \text{ (initial) (modified)} = \frac{2E-2Vd}{R3}$$

$$i \text{ (final) (modified)} = \frac{E-Vd}{R3}$$

Therefore $$\frac{E-Vd}{R3} = \frac{2(E-Vd)}{R3} \exp\left[\frac{-t}{R3C2}\right]$$

It may be seen that the factor $(E-Vd)$ cancels from both sides of the last equation and indeed the solution for the period $t'$ is $t' = R3C2 \ln 2 = .693 \, R3C2$, which is independent of $Vd$.

Instead of the arrangement shown in FIGURE 2, compensation may be achieved, if desired, by placing diodes D5 and D5' (FIGURE 3) between the collectors of transistors Q1 and Q2 and points C and B respectively. Diodes D5 and D5' will both be of material similar to that of emitter-base junctions of transistors Q1 and Q2. This arrangement has the same result as that of FIGURE 2, i.e. when for example transistor Q2 begins to conduct, reference point B (and hence point A) rises by $E-Vd$ volts, instead of simply by E volts as in the uncompensated case. Compensation is thus achieved.

Next referring to FIGURE 6, there is shown a variation in the free running multi-vibrator of FIGURES 1 to 3. In the circuits of FIGURES 1 to 3 the emitter-base junctions of the respective transistors are reverse biased by a voltage of nearly E volts for a short time during each cycle. For some transistors this is acceptable, but for others it is not and the reverse biasing must be limited. This limiting is accomplished in the circuit of FIGURE 6 by the addition of base catching diodes D1 and D2 connected between the bases of transistors Q1 and Q2 respectively and ground, and resistors R5 and R6 extending from the bases of transistors Q1 and Q2 respectively to a $+E$ voltage supply. An isolation diode D3 is connected between the base of transistor Q2 and capacitor C2, being necessary to permit the voltage at point A to rise freely above the base potential of transistor Q1 when transistor Q2 begins to conduct. Similarly an isolation diode D4 is connected between the base of transistor Q2 and capacitor C1. Temperature compensation is provided by diodes D5 and D6 connected between the junction point of charging resistors R1 and R2 and the $-E$ supply.

Figure 7:
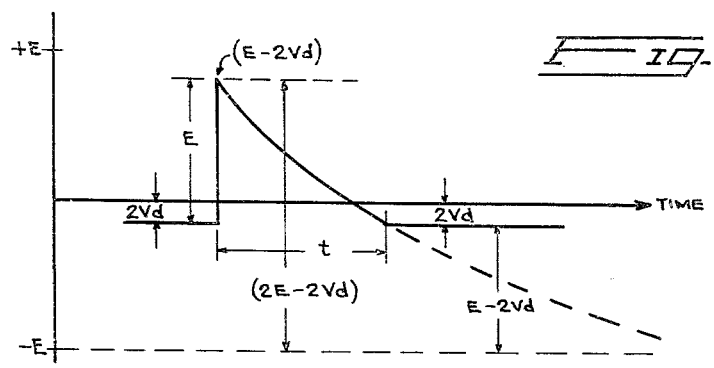
FIGURE 7 is a voltage-time plot illustrating the discharge of capacitors used in a circuit such as that of FIGURE 6 but without temperature compensation means according to the invention.

In operation of the FIGURE 6 device, when transistor Q1 is conducting and transistor Q2 is non-conducting, capacitor C2 charges through the circuit comprising ground, the emitter-base junction of transistor Q1, diode D3, capacitor C2, charging resistor R2, and $-E$ (ignoring for the moment the compensating diodes D5 and D6). In this charging circuit there will be a voltage drop $Vd$ contributed by the emitter-base junction of transistor Q1 and a voltage drop $Vd$ contributed by diode D3. It is assumed for the moment that these two voltage drops are equal. Therefore capacitor C2 will charge (again ignoring diodes D5 and D6) until point B falls to $-E$ and point A falls to a level $2Vd$ volts below ground, as shown in FIGURE 7. Then when transistor Q2 begins to conduct, point A will suddenly rise by E volts and initial discharging current will flow through capacitor C2 as a result of $2E-2Vd$ volts. Capacitor C2 will discharge until point A reaches a level $2Vd$ volts below ground, at which time diode D3 and transistor Q1 become forward biased and transistor Q1 begins to turn on again. The situation is shown in FIGURE 7.

By analysis similar to that used for the FIGURE 2 circuit, it may be shown that the time $t$ required for discharge of capacitor C2 so that point A falls from its initial high level to $2Vd$ volts below ground is:

$$t = R3C2 \ln\left[\frac{2(E-Vd)}{E-2Vd}\right]$$

Figure 8:
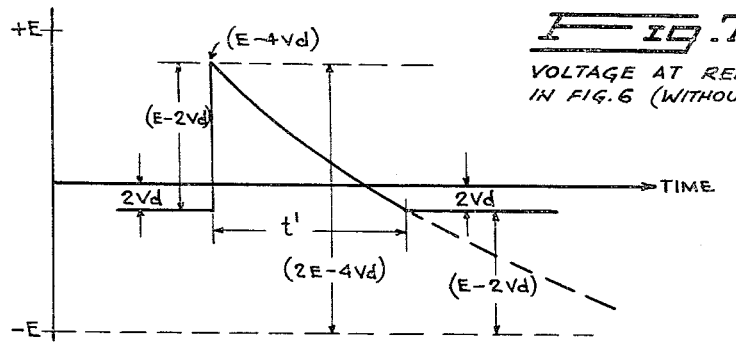
FIGURE 8 is a voltage-time plot illustrating the discharge of capacitors used in a circuit of the type shown in FIGURE 6.

This time is again dependent on $Vd$, which is variable with temperature. When diodes D5 and D6 are inserted as indicated, then when transistor Q2 begins to conduct, the voltage at reference point A suddenly rises by only $E-2Vd$ volts (the $2Vd$ volts being the drop in diodes D5 and D6), instead of by E volts as in the uncompensated case. This is shown in FIGURE 8. It may again be shown that the factor $(E-Vd)$ will now cancel out of the timing equations and the new time $t'$ between the turning off of transistor Q1 and the commencement of its turning on again will be:

$$t' = R3C2 \ln 2 = .693\ R3C2$$

Figure 6A:
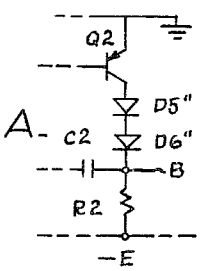
FIGURE 6A shows a portion of a circuit similar to that of FIGURE 6 but with temperature compensation diodes placed in a different location.

In practice the actual compensating means used will not necessarily be, e.g. as shown in FIGURE 6, exactly two diodes. Because of other smaller factors mentioned at the beginning, which contribute to the temperature effect, it is found that for example in the circuit of FIGURE 6, three diodes in series instead of two give a better approximation of perfect compensation. A suitably connected third diode D6' is indicated in dotted lines in FIGURE 6. Similarly in the circuits of FIGURES 1 and 3 it may be desirable to replace each of the diodes with a pair of diodes in series. Instead of diodes D5 and D6 being inserted as shown in FIGURE 6, they may again be inserted in the manner of FIGURE 3, that is to say, a pair of diodes D5″ and D6″ will be inserted between the collector of transistor Q2 and reference point B (as shown in FIGURE 6A) and another similar pair between the collector of transistor Q1 and reference point C.

Referring next to FIGURE 9, there is shown a circuit identical to that of FIGURE 6 except that, in place of series diodes D5 and D6, there is connected to the junction point of resistors R1 and R2 the emitter of a third transistor Q3 of the same type as transistors Q1 and Q2. The collector of transistor Q3 is connected to the $-E$ supply. Extending from the base of transistor Q3, with its cathode connected to the $-E$ supply, is a diode D7 of the same type as diodes D3 and D4.

This combination of transistor Q3 and diode D7 serves to replace the two diodes D5 and D6 of FIGURE 6 as compensating means. The reason for the replacement is as follows: It is found that the forward voltage drop $Vd$ of a semiconductor diode not only varies with temperature; it also varies with the current through the diode. It had been assumed in the description of the operation of the FIGURE 6 device that during charging of capacitor C2, for example (as transistor Q1 conducts), reference point A dropped to a level $2Vd$ volts below ground, $Vd$ volts being contributed by the emitter-base drop of transistor Q1 and $Vd$ volts being contributed by diode D3. In fact, the current through the emitter-base junction of transistor Q1 will be greater than the current through the diode D3 by the factor beta of transistor Q1, so the voltage drop contributed by the emitter-base junction of transistor Q1 will not be quite the same as the voltage drop contributed by diode D3. The voltage drop across the emitter-base junction of transistor Q1 may be termed $V_{be}$ (the same applies to transistor Q2) where $V_{be}$ is not quite equal to $Vd$. Therefore reference point A actually drops to the level $V_{be} + Vd$ volts below ground as indicated in FIGURE 10, during conduction of transistor Q1.

In order to provide more accurate compensation, the compensation network should comprise a pair of diodes having the same current distribution as the emitter-base junction of transistor Q1 and diode D3 (or the emitter-base junction of transistor Q2 and diode D4). This is approximately achieved by transistor Q3 and diode D7 connected as described above. The current through the emitter-base junction of transistor Q3 is approximately alpha times the emitter current of Q1 or Q2, i.e. it is very nearly the same current as flows through the emitter-base junction of transistor Q1 or Q2. Therefore the voltage drop in the emitter-base junction of transistor Q3 is approximately the same as that in the emitter-base junction of transistor Q1 or Q2 (depending on which is conducting), this voltage drop being $V_{be}$. The current through the diode D7 will be less than the emitter current of transistor Q3 by the factor beta so this current will be approximately the same as that through diode D3 or D4 (depending again on which of transistors Q1 and Q2 is conducting). Therefore the voltage drop across diode D7 will be $Vd$ volts. The voltage across the base collector junction of transistor Q3 can be ignored since this junction is reverse biased and acts in effect as a current sink for the portion alpha of the emitter current of transistor Q3.

In the result, the compensating network of FIGURE 9 provides two diodes in series, one with a voltage drop $V_{be}$ and one with a voltage drop $Vd$, as required for more accurate compensation. Upon commencement of conduction of transistor Q2, for example, reference point A rises suddenly by $E - (V_{be} + Vd)$ volts, from which it begins to discharge towards $-E$ (as shown in FIGURE 10). It may be shown again that the factor $E - (V_{be} + Vd)$ cancels out of the equation used to compute the time $t'$ between the turning off of transistor Q1 and the commencement of its turning on again.

As noted before, the foregoing analysis is only approximate and it may be desirable for further compensation to insert additional diodes D8 and D9 between the collectors of transistors Q1 and Q2 and reference points C and B respectively. This arrangement is shown in FIGURE 11. In the circuit of FIGURE 11, resistors R7 and R8 have been added, connected respectively between the $-E$ supply and the collectors of transistors Q1 and Q2. This particular arrangement will facilitate the taking of an output from the collector of one of the transistors without affecting the charging of either of the capacitors C1 or C2.

Figure 12:
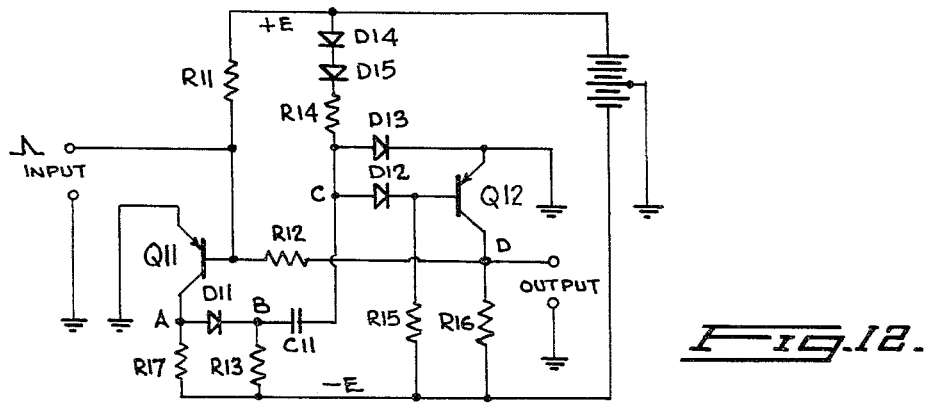
FIGURE 12 shows another type of multivibrator circuit embodying the invention.

Next referring to FIGURE 12, there is shown another type of multivibrator device, a monostable multivibrator identical to that shown in FIGURE 2 of Canadian Patent No. 649,379 except for the addition of two further diodes D14 and D15 which provide the temperature compensation function.

The operation of the device of FIGURE 12 will first be briefly described without regard to the additional diodes D14 and D15.

Transistors Q11 and Q12 both have their emitters grounded and their collectors connected to a negative voltage $-E$ through resistors R17 and R16 respectively. The transistor bases are respectively connected to a positive voltage $+E$ through a resistor R11 and a series connection of a diode D12 and a resistor R14 (ignoring the diodes D14 and D15 for the time being). The collector of transistor Q12 is coupled through a resistor R12 to the base of transistor Q11; the base of transistor Q12 is connected through a resistor R15 to $-E$ and the collector of transistor Q11 is connected through a diode D11 and a resistor R13 to $-E$. The junction point B of diode D11 and resistor R13 is connected by a capacitor C11 to the junction point C of the diode D12 and the resistor R14. The collectors of the respective transistors are referred to as points A and D.

During standby, transistor Q11 is ON and transistor Q12 is OFF. Resistor R14 (15K) is less than resistor R15 (30K) and consequently point C is above ground potential by the magnitude of the voltage drop across diode D13. The values of the resistors, which have been given in parentheses are provided merely as convenient examples of suitable values, and are not intended to restrict the invention. Because the voltage drop across diode D13 is the same as across diode D12, the base of transistor Q12 is at ground potential. Transistor Q12 is thus held OFF. Point D is negative and through resistor R12 biases the transistor Q11 ON; resistors R16 (3.32K) and R12 (3.32K) being less than resistor R11 (220K).

When a positive trigger pulse is applied to the base of transistor Q11, this transistor is turned OFF, permitting point A to fall to nearly $-E$ through resistor R17 (8.2K). Resistor R13 (3.32K) is less than resistor R14 (15K) and consequently points B and C which are coupled by capacitor C11 both fall momentarily to a negative voltage, causing diodes D11, D12 and D13 to become reverse biased. With the base of transistor Q12 no longer held up at ground potential by diode D12, transistor Q12 is turned ON into saturation by a current supplied through resistor R15. Point D rises to approximately ground potential, and through resistors R12 and R11 causes the base of transistor Q11 to be slightly positive with respect to ground. Consequently transistor Q11 is now held OFF. The flip-flop is now in its triggered or "operated" state. The circuit function just described requires resistor R15 to be greater than resistor R14 and the latter to be greater than resistor R13, at least for the applied voltages employed.

The timing capacitor C11 now begins to charge through resistors R13 and R14 which respectively constitute the first and second resistance arms of the timing circuit. Point B falls towards $-E$ and point C rises. As point C approaches ground potential, diode D12 becomes forward biased, and, after a short further period, the transistor Q12 is cut OFF, the base current that had been flowing into this transistor from resistor R15 transferring to the diode D12 and the resistor R14. With the transistor Q12 cut off, point D falls towards $-E$ causing the transistor Q11 to be turned ON. A quick regenerative action takes place at this time due to the capacitive coupling between the transistors. This is as follows: as point A rises towards ground, diode D11 becomes forward biased, causing point B to rise also; point C rises along with point B, due to the capacitive coupling; this produces an even more rapid decrease in the base current of transistor Q12; the result is a rapid reset of the circuit. As point C is raised above ground, diode D13 becomes forward biased, permitting the capacitor C11 to be discharged to ground. The maximum discharge current of the capacitor is limited only by the maximum permissible collector current of transistor Q11 and the forward resistances of diodes D11 and D13. Very rapid recovery to the standby condition can thus be realized.

The basic timing equation for the time $t$ from triggering to resetting is given by:

$$t = C11 \left( (R13+R14) \ln \left[ \frac{2R14}{(R13+R14)} \left( \frac{E-Vd}{E} \right) \right] \right.$$
$$\left. + R13 \ln \left[ \frac{1}{1+R14 \left( \frac{E-Vd}{E} \right) \left( \frac{1}{\beta_{12}R_{16}} - \frac{1}{R_{15}} \right)} \right] \right)$$

where $Vd$ = the forward voltage drop across each of the diodes D11 and D13, and $\beta_{12}$ = the collector to base current ratio of the transistor Q12.

Figure 13:
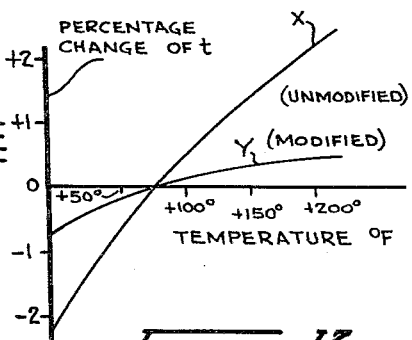
FIGURE 13 is a temperature-time characteristic diagram for the device of FIGURE 12.

Both these latter quantities are temperature dependent, and FIGURE 13 shows curve X which is the percentage change of $t$ with temperature as determined by experiment. The main contribution to the variation of $t$ is made by the first term in the above equation, and it is for this reason that the modification of the present embodiment of the invention concentrates on minimizing the effect of the temperature dependence of $Vd$. The effect of $\beta_{12}$ can be minimized by choosing a transistor with a high value of $\beta$, for example 100 or more, since it can be shown that the percentage effect of a change in $\beta_{12}$ becomes less, the higher the basic value of $\beta_{12}$.

The present embodiment depends on the appreciation that the term $Vd$ can be eliminated from the first term of the timing equation by the addition of the two diodes D14 and D15 in series with the resistor R14.

To appreciate why this will be so, it is necessary to demonstrate why the expression $$\frac{E-Vd}{E}$$

appears in the timing equation. For this purpose, it is necessary to find the initial and final charging currents I (initial) and I (final) for the capacitor C11, for a time $t1$ beginning at the instant of triggering, and ending at the instant when diode D12 becomes forward biased (point C reaches ground potential). It is this time $t1$ that is represented by the first term in the timing equation. The second term, which is substantially smaller, represents the time $t2$ between diode D12 becoming forward biased and the transistor Q12 being shut OFF. The total time $t = t1 + t2$.

Expressions for I (initial) and I (final) will now be derived for the circuit unmodified (without diodes D14, D15) and for the circuit modified (with diodes D14, D15). The initial charging current flows as a result of a voltage 2E, and flows through resistors R13 and R14. However, before this time (that is during standby), the capacitor C11 will have acquired a small initial charge on it. Assuming point A to be truly ground (transistor Q11 being ON and saturated), then point B will be below ground by the amount of the voltage drop across diode D11, namely the amount $Vd$. On the other side of the capacitor, point C will be at a potential above ground equal to $Vd$, the drop across diode D13. Thus the capacitor has an initial charge of $2Vd$ which must be subtracted from the applied voltage 2E when calculating the initial charging current. The initial charging current will thus be as follows:

$$I \text{ (initial) (unmodified)} = \frac{2E - 2Vd}{R13 + R14}$$

With the added voltage drops of two diodes D14, D15

$$I \text{ (initial) (modified)} = \frac{2E - 4Vd}{R13 + R14}$$

Since the time of I (final) is defined as the instant when point C reaches ground potential, effectively the only voltage is now E and the only resistor now R14. Then $$I \text{ (final) (unmodified)} = \frac{E}{R14}$$

and $$I \text{ (final) (modified)} = \frac{E - 2Vd}{R14}$$

Since the capacitor is being charged $$I \text{ (final)} = I \text{ (initial) exp.} \left[ \frac{-t1}{(R13+R14)C11} \right]$$

Applying this equation to the unmodified values for I (initial) and I (final) gives $$(\text{Unmodified}) \frac{E}{R14} = \frac{2E - 2Vd}{R13 + R14} \exp. \left[ \frac{-t1}{(R13+R14)C11} \right]$$

It will be clear that $Vd$ cannot be eliminated from this equation, and indeed the solution of this equation for $t1$ provides the first term of the timing equation above.

Now the charging equation is applied to the modified values for I (initial) and I (final)

$$(\text{Modified}) \frac{E - 2Vd}{R14} = \frac{2E - 4Vd}{R13 + R14} \exp. \left[ \frac{-t1}{(R13+R14)C11} \right]$$

It will be immediately apparent that the factor $E - 2Vd$ cancels out, and thus eliminates $Vd$. The solution for $t1$ then yields a first term for the timing equation of $$t1 = C11(R13+R14) \ln \left[ \frac{2R14}{R13+R14} \right]$$

Taking the specific example of the circuit values suggested for the circuit shown in FIGURE 12, the rate of change of the first term $t1$ with $Vd$ is shown by equations as follows:

$$(\text{Unmodified}) \frac{dt1}{dVd} \approx -262 \text{ microseconds/volt}$$

$$(\text{Modified}) \frac{dt1}{dVd} \approx 0$$

The effect of $Vd$ on the second term of the timing equation, which represents the time $t2$ between the point C reaching ground potential and the transistor Q12 being turned OFF, is shown by equations (Unmodified) $\frac{dt2}{dVd} \approx -38$ microseconds/volt (Modified) $\frac{dt2}{dVd} \approx +50$ microseconds/volt It can thus be seen that the total change of $(t1+t2)$ per volt change of $Vd$, is $-300$ microseconds for the unmodified circuit and $+50$ microseconds for the modified circuit. This is obviously a significant improvement. In addition, the modified value for $dt/dVd$ is positive, while the value for $dt/d\beta_2$ is negative, so that the factors are in opposition, rather than additive. Results of an experiment using the modified circuit of FIGURE 12 are plotted as curve Y in FIGURE 13. This figure shows percentage time change against temperature and thus the curves have positive slopes, since $Vd$ varies inversely (substantially linearly) with temperature.

The same principle of temperature compensation is applicable to other circuits in which the timing equation is affected by the voltage drop $Vd$ in one or more diodes serving to isolate a resistance-capacitance circuit from one or more transistors. For example, in the circuit shown as FIGURE 1 of Canadian Patent No. 649,379, only the end of the timing circuit connected to the transistor Q2 is initially subjected to the voltage drop of a diode. In this case, a single temperature compensation diode (i.e. either D14 alone or D15 alone) placed in series with the resistor located at the end of the resistance-capacitance circuit that is connected to the transistor Q2 will accomplish temperature compensation.

Figure 14:
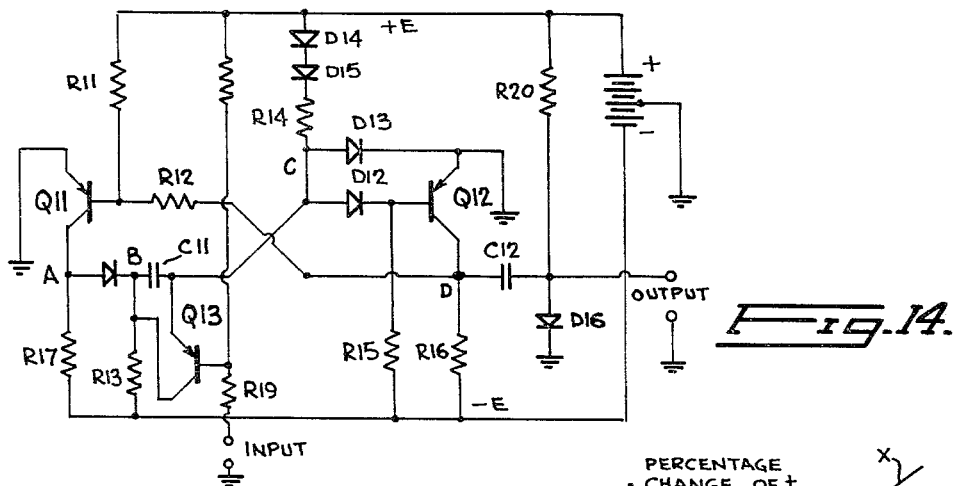
FIGURE 14 shows another device embodying the invention.

FIGURE 14 shows the circuit described in Canadian Patent No. 675,469 modified in a like manner by the inclusion of two additional diodes D14 and D15. The circuit is a monostable multivibrator similar to that of FIGURE 12 but with the emitter of a third transistor Q13 connected at reference point C to one side of capacitor C11, the collector of transistor Q13 being connected at reference point B to the other side of capacitor C11. Transistor Q13 is biased to a normally non-conducting condition by resistor R18 connected between the base of transistor Q13 and the +E voltage supply. The base of transistor Q13 is further connected, through resistor R19, to an input for negative going pulses.

The purpose of the circuit of FIGURE 14 is to provide an arrangement wherein pulses with a predetermined interval between them are supplied to the input, and an output is obtained only when the input pulses cease to be supplied, or the time interval between them exceeds a predetermined length. The circuit may thus be used in connection with an alarm.

The operation of the device of FIGURE 14 is as follows:

When a first negative going input pulse is applied to the input terminals, transistor Q13 is forward biased into saturation. The potential at reference point C momentarily falls below ground, causing diodes D12 and D13 to become reverse biased, permitting transistor Q12 to conduct and transistor Q11 to be turned off.

When the first negative going input pulse is removed, transistor Q13 becomes non-conducting again. Capacitor C11 begins to charge and the potential at reference point C begins to rise towards ground for rendering diodes D12 and D13 forward biased again to reset the circuit. However before the potential at reference point C reaches ground, a second negative going input pulse is supplied, forward biasing transistor Q13 into saturation again and causing it to discharge capacitor C11. Capacitor C11 must now begin to charge anew in order to return the device to standby condition in which transistor Q11 is conducting and transistor Q12 is non-conducting. This charge-discharge cycle is repeated as long as a subsequent negative going pulse arrives at the input before capacitor C11 can charge sufficiently to reset the device. If no input pulse arrives until after the time required for C11 to charge sufficiently that point C reaches ground, transistor Q12 is turned off and transistor Q11 is turned on. The circuit has now recovered through monostable action.

An output circuit is provided comprising capacitor C12 having one terminal connected to the collector of transistor Q12 and the other terminal connected through resistor R20 to the +E supply and through diode D16 to ground. When the circuit recovers and transistor Q12 ceases to conduct, point D goes negative and a negative output pulse is transmitted through capacitor C12 to reverse bias the diode D16.

It is desirable in this circuit that the time between turning on of transistor Q12 and the charging of capacitor C11 to a point to turn transistor Q12 off be independent of temperature. To this end, diodes D14 and D15 are connected between the +E supply and the end of resistor R14, just as in the circuit of FIGURE 12. Substantially the same equation as described above governs the operation of this circuit.

Figure 15:
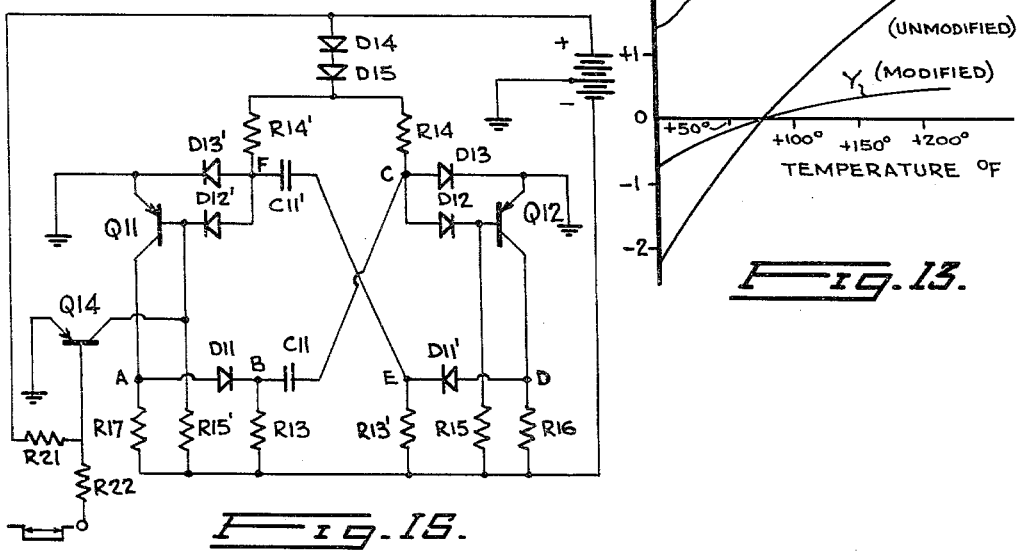
FIGURE 15 shows yet another type of multivibrator circuit embodying the invention.

FIGURE 15 shows the circuit described in Canadian Patent No. 676,333 modified in a like manner by inclusion of two additional diodes D14 and D15 in the resistance-capacitance timing circuits. This circuit is a free running multi-vibrator comprising essentially two halves, each of which operates to control the other in the same manner as described for the circuit of FIGURE 12. The circuit includes transistors Q11 and Q12 connected by a coupling arm extending from the collector of transistor Q11 to the base of transistor Q12, the coupling arm including diode D11, capacitor C11, and diode D12 connected in series. Another coupling arm extends from the collector of transistor Q12 to the base of transistor Q11 and includes diode D11', capacitor C11', and diode D12'. The collectors of transistors Q11 and Q12 are connected to a $-E$ supply through resistors R17 and R16 respectively, and their bases are connected to the $-E$ supply through biasing resistors R15' and R15 respectively. The emitter of transistor Q11 is connected to ground and also to the cathode of diode D13', the anode of which is connected to the junction point F between diode D12' and capacitor C11'. Point F is connected through resistor R14' to the cathode of compensating diode D15, diode D15 being connected to compensating diode D14 which is connected to a +E supply. Similarly the emitter of transistor Q12 is connected to ground and to the cathode of diode D13, the anode of which is connected to the junction point C between diode D12 and capacitor C11. Point C is connected through resistor R14 to the cathode of compensating diode D15. A resistor R13 is connected between the $-E$ supply and the junction point B between diode D11 and capacitor C11, and a resistor R13' is connected between the $-E$ supply and the junction point E between diode D11' and capacitor C11'. A and D are reference points.

The operation of the circuit of FIGURE 15 is similar to that of the circuit of FIGURE 12. If the multi-vibrator has just turned over into the state where transistor Q12 is conducting and transistor Q11 is non-conducting, then diodes D11, D12 and D13 are reverse biased, and diodes D11', D12' and D13' are forward biased. The required negative bias at the base of transistor Q12 is supplied through resistor R14. Timing capacitor C11 now begins to charge through timing resistors R14 and R13 (and compensating diodes D14 and D15), and as point C approaches ground potential diodes D12 and D13 become forward biased, causing transistor Q12 to become non-conducting. The potential at point D then falls towards $-E$ and this negative going step is transmitted through capacitance C11' to reference point F. Diodes D11', D12' and D13' become reverse biased, permitting transistor Q11 to turn on. This periodic reversal of state continues. Again, for proper operation, resistors R15 and R15' should be greater than resistors R14 and R14' respectively; and resistors R14 and R14′ should be greater than resistors R13 and R13′ respectively.

The oscillation of the multi-vibrator may be caused to cease by providing a short circuit between the base and emitte grounded, its collector connected to the base of one cycle of the multi-vibrator. The short circuit is conveniently provided by a third transistor Q14 having its emitter grounded, its collector connected to the base of transistor Q11. Transistor Q14 is biased through resistor R21, and when it is driven into saturation through resistor R22, it will short circuit the base-emitter junction of transistor Q11. The multi-vibrator will then remain off until it is retriggered by a negative pulse applied to the base of either of transistors Q11 or Q12.

The function of the compensating diodes D14 and D15 in effecting temperature compensation in the device of FIGURE 15 is the same as their function in the monostable device of FIGURE 12, and substantially the same timing equations as described previously govern the operation of the device.

It will be apparent that in all the circuits described, NPN transistors instead of PNP transistors may be used, with the necessary changes in polarity of diodes and supply voltages. For example, if NPN transistors were used in the circuit of FIGURE 2, the −E supply would become +E supply and diode D5 would have its polarity reversed. If NPN transistors were used in the circuit of FIGURE 12, again the +E supply would have its sign changed to −E, and the polarity of diodes D11, D12, D13, D14 and D15 would be reversed.

It will be realized that in the foregoing description, a number of assumptions have necessarily been made in order to simplify the illustrative analysis, which is thus approximate only. The characteristics of multi-vibrator devices embodying compensating means according to the invention are substantially less temperature dependent than devices not including such compensating means, but in some cases the compensation may be rather more exact than in others. The term "compensation" as here used is thus meant to include not only theoretically exact compensation, where there is virtually no temperature dependence in the timing characteristics of the multi-vibrator device after compensation, but also (a) Under compensation, where after insertion of compensation means the timing characteristics of the device still have some temperature dependence, although substantially less than before compensation, and (b) Over compensation, where after compensation the timing characteristic of the device still have some temperature dependence, substantially less in absolute magnitude than before compensation and with the direction of the temperature dependent variation changed (e.g. if a temperature increase produced a decrease in the duration of a conducting period of a transistor before compensation, that temperature increase will produce an increase in such duration after compensation).

I claim:
1. In a multivibrator device having
   (a) a pair of transistors interconnected for timed mutual reversal of state,
   (b) a timing circuit comprising a series connection of a first resistance arm, a capacitor arm and a second resistance arm,
   (c) and means connecting the junction points between said resistance arms and said capacitor arm to respective transistors,
   (d) said means (c) including means connecting said timing circuit to a selected one of said transistors for initiation of reversal of the state of the device at the end of a timed period,
   (e) and said means (c) further including temperature dependent means for isolating the capacitor arm from at least one of said transistors during said timed period, said isolating means being connected to impose an initial, temperature dependent voltage on said capacitor arm prior to said timed period;
the improvement comprising
   (f) means for generating a voltage drop substantially equal to and temperature dependent with said initial voltage,
   (g) and means connecting said means (f) in the resistance arm connected to said selected transistor.

2. A multivibrator circuit comprising in combination: a first and second transistor of the same conductivity each having a base, emitter and collector electrode, a cross connecting means consisting of a coupling arm individually connected between the base and collector electrodes of the first and second transistors, each arm having a unidirectional element and capacitor connected in series relation to form a first and second junction point respectively, with the anodes of the unidirectional elements connected to the base electrodes of the transistors, a direct current energy source, a first and second resistor connected to the positive terminal of the energy source and individually to the base electrode of the first and second transistor to form a third and fourth junction point respectively, a third and fourth resistor connected individually to the collector electrode of the first and second transistor respectively, and connected together to form the fifth junction point, a fifth and sixth resistor connected individually to the first and second junction points, and connected together to said negative terminal, a series of diodes connected in series with the anode of each diode connected to the cathode of the preceding diode and with the anode of the first diode connected to the fifth junction point and the cathode of the last diode connected to said negative terminal, and means for grounding the emitter electrode of each transistor, and the common point of the positive and negative energy sources.

3. A multivibrator as defined in claim 2 having in combination therewith, an additional diode individual to each transistor having the cathode connected to the emitter electrode of the first and second transistor and the anode to the third and fourth junction points, respectively.

4. A multivibrator circuit as defined in claim 2 in which the diodes of said series are of the same material as the transistors.

5. A multivibrator device including
   (a) a pair of transistors,
   (b) coupling means including a capacitance interconnecting said transistors for mutual reversal of state so that each said transistor has a conducting and a non-conducting state,
   (c) charging means associated with said capacitance for establishing thereon a first charge level,
   (d) a timing circuit coupled to said capacitance for discharging said capacitance to a second charge level for controlling the duration of a non-conducting state of a selected one of said transistors, both said charge levels being modified by a voltage variable with temperature to cause a temperature dependent variation in said duration,
   (e) said charging means comprising a series circuit, one terminal of said series circuit being connected to said capacitance and the other terminal of said series circuit being for connection to a source of potential for charging said capacitance through said series circuit, said series circuit including resistance means and a plurality of temperature compensation diodes all in series, with said diodes connected each in the same direction to pass charging current for said capacitance, said diodes producing a compensating voltage drop substantially equal to and temperature dependent with said modifying voltage, whereby to compensate for said variation in duration.

6. A multivibrator device including
   (a) first and second transistors, (b) coupling means interconnecting said transistors for mutual reversal of state so that each said transistor has a conducting and a non-conducting period,
(c) said coupling means including a first coupling arm including a capacitance extending from the base of said first transistor to the collector of said second transistor,
(d) said coupling means also including a second coupling arm extending from the base of said second transistor to the collector of said first transistor,
(e) charging means associated with said capacitance for bringing said capacitance to an initial charge level during a conducting period of said first transistor for transition to a first charge level upon commencement of a conducting period of said second transistor,
(f) a timing circuit coupled to said capacitance for discharging said capacitance from said first charge level to a second charge level for controlling the duration of a non-conducting period of said first transistor, both said charge levels being modified by a voltage variable with temperature to cause a temperature dependent variation in said duration,
(g) said charging means including a series circuit, one terminal of said series circuit being connected to said capacitance and to the collector of said second transistor, the other terminal of said series circuit being for connection to a source of potential to charge said capacitance through said series circuit, said series circuit including resistance means and a plurality of temperature compensation diodes all in series, with said diodes connected each in the same direction to pass charging current for said capacitance, said diodes producing a compensating voltage drop substantially equal to and temperature dependent with said modifying voltage, whereby to compensate for said variation in duration.

7. A multivibrator device including
(a) first and second transistors,
(b) coupling means interconnecting said transistors for mutual reversal of state so that each said transistor has a conducting and a non-conducting period,
(c) said coupling means including a first coupling arm including a capacitance extending from the base of said first transistor to the collector of said second transistor,
(d) said coupling means also including a second coupling arm extending from the base of said second transistor to the collector of said first transistor,
(e) charging means associated with said capacitance for bringing said capacitance to an initial charge level during a conducting period of said first transistor for transition to a first charge level upon commencement of a conducting period of said second transistor,
(f) a timing circuit coupled to said capacitance for discharging said capacitance from said first charge level to a second charge level for controlling the duration of a non-conducting period of said first transistor, both said charge levels being modified by a voltage variable with temperature to cause a temperature dependent variation in said duration,
(g) said charging means including resistance means connected to said capacitance and for connection to a source of potential to charge said capacitance through said resistance means,
(h) and a plurality of series temperature compensation diodes connected between the collector of said second transistor and the junction of said capacitance with said resistance means, said diodes being connected each in the same direction to pass collector current of said second transistor, said diodes producing a compensating voltage drop substantially equal to and temperature dependent with said modifying voltage, whereby to compensate for said variation in duration.

8. A multivibrator device including
(a) first and second transistors,
(b) coupling means interconnecting said transistors for mutual reversal of state so that each said transistor has a conducting and a non-conducting period,
(c) said coupling means including a first coupling arm including a capacitance extending from the base of said first transistor to the collector of said second transistor,
(d) said coupling means also including a second coupling arm extending from the base of said second transistor to the collector of said first transistor,
(e) charging means associated with said capacitance for bringing said capacitance to an initial charge level during a conducting period of said first transistor for transition to a first charge level upon commencement of a conducting period of said second transistor,
(f) a timing circuit coupled to said capacitance for discharging said capacitance from said first charge level to a second charge level for controlling the duration of a non-conducting period of said first transistor, both said charge levels being modified by a voltage variable with temperature to cause a temperature dependent variation in said duration,
(g) said charging means including a series circuit comprising resistance means and at least one temperature compensation diode, one terminal of said series circuit being connected to said capacitance and the other terminal of said series circuit being for connection to a source of potential to charge said capacitance through said series circuit,
(h) and at least one further temperature compensation diode being connected between the collector of said second transistor and the junction of said capacitance with said series circuit, both said diodes being connected in the same direction to pass collector current of said second transistor, said diodes producing a compensating voltage drop substantially equal to and temperature dependent with said modifying voltage, whereby to compensate for said variation in duration.

9. A free-running multivibrator device including
(a) first and second transistors,
(b) coupling means interconnecting said transistors for mutual reversal of state so that each said transistor has a conducting and a non-conducting state,
(c) said coupling means including first and second coupling arms respectively extending between said transistors, said first and second coupling arms including first and second capacitances respectively,
(d) first charging means associated with said first capacitance for establishing thereon a first charge level,
(e) a first timing circuit coupled to said first capacitance for discharging said first capacitance to a second charge level for controlling the duration of a non-conducting state of one of said transistors, both said charge levels of said first capacitance being modified by a voltage variable with temperature to cause a temperature dependent variation in said duration,
(f) second charging means associated with said second capacitance for establishing thereon a third charge level,
(g) a second timing circuit coupled to said second capacitance for discharging said second capacitance to a fourth charge level for controlling the duration of a non-conducting state of the other of said transistors, said third and fourth charge levels being modified by said voltage variable with temperature to cause a temperature dependent variation in the duration of the non-conducting state of said other transistor, (h) said first charging means including first resistance means and said second charging means including second resistance means, said first and second resistance means being connected together at a junction point and being connected individually to said first and second capacitances respectively, (i) and a plurality of series temperature compensation diodes connected to said junction point and for connection to a source of potential for charging of said capacitances through said diodes, said diodes being connected each in the same direction to pass charging current for said capacitances, said diodes producing a compensating voltage drop substantially equal to and temperature dependent with said modifying voltage, whereby to compensate for said variations in duration.

10. A free-running multivibrator device including (a) first and second transistors,
(b) coupling means interconnecting said transistors for mutual reversal of state so that each said transistor has a conducting and a non-conducting period,
(c) said coupling means including a first coupling arm having a first isolation diode connected to the base of said first transistor and a first capacitance connected to said first diode and coupled to the collector of said second transistor,
(d) said coupling means also including a second coupling arm having a second isolation diode connected to the base of said second transistor and a second capacitance connected to said second iode and coupled to the collector of said first transistor,
(e) first charging means associated with said first capacitance for establishing thereon a first charge level,
(f) a first timing circuit coupled to said first capacitance for discharging the same to a second charge level for controlling the duration of a non-conducting period of said first transistor, said first transistor and said first diode producing a temperature dependent voltage drop which modifies said charge levels to cause a temperature dependent variation in said duration,
(g) second charging means associated with said second capacitance for establishing thereon a third charge level,
(h) a second timing circuit coupled to said second capacitance for discharging the same to a fourth charge level for controlling the duration of a non-conducting period of said second transistor, said second transistor and said second diode producing said temperature dependent voltage drop which modifies said third and fourth charge levels to cause a temperature dependent variation in the duration of the non-conducting period of said second transistor,
(i) said first charging means including first resistance means and said second charging means including second resistance means, said first and second resistance means being connected together at a junction point and being coupled individually to said first and second capacitances respectively,
(j) and three series temperature compensation diodes connected to said junction point and for connection to a source of potential for charging of said capacitances through said diodes, said diodes being connected each in the same direction to pass charging current for said capacitances, said diodes producing a compensating voltage drop substantially equal to and temperature dependent with said first mentioned temperature dependent voltage drop, whereby to compensate for said variations in duration.

11. A multivibrator device including (a) first and second transistors,
(b) coupling means interconnecting said transistors for mutual reversal of state so that each said transistor has a conducting and a non-conducting period,
(c) said coupling means including a first coupling arm having an isolation diode connected to the base of said first transistor, and a capacitance connected to said isolation diode and coupled to the collector of said second transistor,
(d) said coupling means also including a second coupling arm extending from the base of said second transistor to the collector of said first transistor,
(e) charging means associated with said capacitance for bringing said capacitance to a first charge level,
(f) a timing circuit coupled to said capacitance for discharging said capacitance to a second charge level for controlling the duration of a non-conducting period of said first transistor,
(g) said isolation diode, and the base-emitter junction of said first transistor, having temperature dependent voltage characteristics which modify said charge levels to cause a temperature dependent variation in said duration,
(h) said charging means including resistance means coupled to said capacitance, a temperature compensation transistor having its emitter connected to said resistance means, and a temperature compensation diode connected to the base of said compensation transistor, said compensation transistor and said compensation diode being connected to pass charging current for said capacitance therethrough,
(i) further resistance means connected between the collector of said first transistor and of the emitter of said compensation transistor,
(j) the base-emitter junction of said compensation transistor having temperature dependent voltage characteristics similar to those of the base-emitter junction of said first transistor, and said compensation diode having temperature dependent voltage characteristics similar to those of said isolation diode, the base-emitter junction of said compensation transistor, and said compensation diode, producing temperature dependent voltage drops to compensate for temperature dependent voltage drops in the base-emitter junction of said first transistor and in said isolation diode, thus to compensate for said variation in duration.

12. A free-running multivibrator device including (a) first and second transistors,
(b) coupling means interconnecting said transistors for mutual reversal of state so that each said transistor has a conducting and a non-conducting period,
(c) said coupling means including a first coupling arm having a first isolation diode connected to the base of said first transistor and a first capacitance connected to said first diode and coupled to the collector of said second transistor,
(d) said coupling means also including a second coupling arm having a second isolation diode connected to the base of said second transistor and a second capacitance connected to said second diode and coupled to the collector of said first transistor,
(e) first charging means associated with said first capacitance for establishing thereon a first charge level,
(f) a first timing circuit coupled to said first capacitance for discharging the same to a second charge level for controlling the duration of a non-conducting period of said first transistor, the base-emitter junction of said first transistor and said first diode having temperature dependent voltage characteristics which cause a temperature dependent variation in said duration,
(g) second charging means associated with said second capacitance for establishing thereon a third charge level,
(h) a second timing circuit coupled to said second capacitance for discharging the same to a fourth charge level for controlling the duration of a non-conducting period of said second transistor, the base-emitter junction of said second transistor and said second diode having temperature dependent voltage characteristics similar to those of the base-emitter junction of said first transistor and of said first diode respectively and which cause a temperature dependent variation in the duration of the non-conducting period of said second transistor,
(i) said first charging means including first resistance means and said second charging means including second resistance means, said first and second resistance means being connected together at a junction point and being coupled individually to said first and second capacitances respectively,
(j) and temperature compensation means comprising a third transistor having its emitter connected to said junction point, and a third diode connected between the base and collector of said third transistor, the collector of said third transistor being for connection to a source of potential for charging of said capacitances through said third transistor and through said third diode,
(k) the base-emitter junction of said third transistor having temperature dependent voltage characteristics similar to those of the base-emitter junctions of said first and second transistors, and said third diode having temperature dependent voltage characteristics similar to those of said first and second diodes, the base-emitter junction of said third transistor, and said third diode, producing temperature dependent voltage drops to compensate for temperature dependent voltage drops in the base-emitter junction of said first transistor and in said first diode, and in the base-emitter junction of said second transistor and in said second diode, respectively, thus to compensate for said variations in duration.

13. A multivibrator device having
(a) a pair of transistors interconnected for timed mutual reversal of state,
(b) a timing circuit comprising a series connection of a first resistance, a capacitance, and a resistance arm including a second resistance, said resistance arm being for connection to a source of potential for charging said capacitance therethrough,
(c) means connecting the junction of said first resistance and said capacitance to the collector of said first transistor,
(d) means connecting the junction of said capacitance and said resistance arm to the base of said second transistor for initiation of reversal of the state of said device at the end of a timed period,
(e) said means (c) and (d) including temperature dependent means for isolating the capacitor from said transistors during said timed period, said isolating means being connected to impose an initial, temperature dependent voltage on said capacitor prior to said timed period,
(f) said resistance arm including therein, in series with said second resistance, a plurality of series connected temperature compensation diodes, said diodes being connected each in the same direction to pass charging current for said capacitance, said diodes producing a voltage drop substantially equal to and temperature dependent with said initial drop.

14. A free-running multivibrator device including
(a) first and second transistors interconnected for timed mutual reversal of state, each of said transistors having a conducting and a non-conducting period,
(b) a first timing circuit comprising a series connection of a first resistance, a capacitance, and a second resistance,
(c) a first diode connected between the collector of said first transistor and the junction of said first resistance with said first capacitance,
(d) a second diode connected between the base of said second transistor and the junction of said capacitance with said second resistance, said first timing circuit controlling the duration of a conducting period of said second transistor and said first and second diodes imposing an initial, temperature dependent voltage on said first capacitance prior to said conducting period of said second transistor,
(e) a second timing circuit comprising a series connection of a third resistance, a second capacitance, and a fourth resistance,
(f) a third diode connected between the collector of said second transistor and the junction of said third resistance with said second capacitance,
(g) a fourth diode connected between the base of said first transistor and the junction of said fourth resistance with said second capacitance, said second timing circuit controlling the duration of a conducting period of said first transistor, said third and fourth diodes imposing said initial temperature dependent voltage on said second capacitance prior to the conducting period of said first transistor,
(h) said second and fourth resistances being connected together at a junction point remote from said first and second capacitances respectively,
(i) and a plurality of series temperature compensation diodes connected to said junction point, and for connection to a source of voltage for charging said capacitances therethrough, said diodes each being connected in the same direction for passing charging current for said capacitances, said diodes generating a voltage drop substantially equal to and temperature dependent with said initial drop.

References Cited by the Examiner

UNITED STATES PATENTS

| 2,874,315 | 2/1959 | Reichert. | |
| 3,013,220 | 12/1961 | Norris | 331—113 |
| 3,017,524 | 1/1962 | Koletsky et al. | 307—88.5 |
| 3,039,065 | 7/1962 | Regis | 331—113 |
| 3,060,386 | 10/1962 | Cerofolini | 331—113 |
| 3,077,567 | 2/1963 | Gray | 331—113 |

FOREIGN PATENTS

| 649,379 | 9/1962 | Canada. |
| 675,469 | 12/1963 | Canada. |
| 1,121,112 | 1/1962 | Germany. |

ROY LAKE, *Primary Examiner.*